March 24, 1964     H. A. LASSEN ETAL     3,125,886
MAGNETICALLY PRECESSIBLE FREE GYROSCOPE Filed Dec. 11, 1959     5 Sheets-Sheet 1

INVENTORS.
HERBERT A. LASSEN,
REYNOLD L. SAARI,
BY
AGENT.

INVENTORS.
HERBERT A. LASSEN,
REYNOLD L. SAARI,

BY
AGENT.

COMMON RETURN PATH

YAW PLANE - TORQUER COILS

PITCH PLANE - TORQUER COILS

March 24, 1964 H. A. LASSEN ETAL 3,125,886
MAGNETICALLY PRECESSIBLE FREE GYROSCOPE
Filed Dec. 11, 1959 5 Sheets-Sheet 5

YAW PLANE — PICKOFF COILS

PITCH PLANE — PICKOFF COILS

INVENTORS
HERBERT A. LASSEN,
REYNOLD L. SAARI,
BY
AGENT

United States Patent Office 3,125,886
Patented Mar. 24, 1964

3,125,886
MAGNETICALLY PRECESSIBLE FREE
GYROSCOPE
Herbert A. Lassen, Los Angeles, and Reynold L. Saari, Venice, Calif., assignors to Hughes Aircraft Company, Culver City, Calif., a corporation of Delaware
Filed Dec. 11, 1959, Ser. No. 858,984
12 Claims. (Cl. 74—5.6)

The present invention relates generally to gyroscopes, and relates more specifically to a magnetically precessible type of free gyroscope that is extremely small in physical configuration and which is suitable for use in connection with the control of vehicles, wherein size and weight considerations are important factors.

Gyroscope devices utilized in conjunction with, or an integral part of attitude control mechanisms, have long been known. Various attempts have been made to reduce the size and weight of the gyroscope devices, including a rotating element, a gimbal system, spin motors, torquing and signal pickoff coils and the like. These attempts have been met with many problems associated with physical mountings, choices of materials, relationships of elements and their construction and the function of both electrical and magnetic components thereof. The concept of applying magnetic forces directly to a spinning gyroscope wheel, as a means of torquing or precessing the gyroscope in a controlled manner, has for many years been an optimum consideration. Prior attempts in this direction have been met with problems relating to size and weight of the necessary elements, together with problems associated with the existence of the magnetic fields and the interaction between rotating elements and electromagnets. These problems have taken the form of eddy current losses, undesired drag on a spinning wheel, development of excessive heat and the like. In attempting to solve such problems, high torque wheel spinning motors have had to be employed and various compensating mechanisms have been used to overcome undesired drift and associated inaccurate output signals.

The use of an extremity high resistance and high permeability material of the ferrite class to form a portion of the gyroscope wheel, forms a basis for this invention and provides a practical means for realizing the desired concept. The direct magnetic precessing of the gyroscope in correspondence with applied signals also enables a small, compact and high performance gyroscope unit, thus enabling use thereof as an inertial reference component in vehicle guidance systems.

The present gyroscope device is provided with magnetic torquers which serve to position a rotating gyroscope wheel about each of its gimbal axes by means of signal currents fed into coils of plural magnetic torquers. Position sensing devices are also included to measure the position of the gyroscope wheel with respect to a housing or supporting structure for a case thereof. In actual practice, the present gyroscope unit is approximately 3.4 inches in length and 2 inches in diameter, presenting a maximum precession rate capability of approximately 84 degrees per second, with the linear torquing range being limited to plus or minus approximately 14 degrees about each gimbal axis.

It is therefore one important object of the present invention to provide a magnetically precessible free gyroscope unit where torquing of a spinning gyroscope wheel is magnetically applied directly to the spinning wheel.

It is another important object of the invention to provide a gyroscopic device including a rotating gyroscopic wheel, means to support and rotate the wheel and wherein a portion of the wheel comprises a ring of ferrite material.

Still another object of the invention is to provide a gyroscopic device, having a magnetically precessible spinning wheel and wherein the arrangement of components is such as to enable a light-weight, compact and efficiently operable structure.

Another important object of the invention is to provide a gyroscopic device wherein magnetic flux paths are such as to reduce or eliminate eddy current producing effects upon the gyroscope wheel, due to the presence of magnetic torquers and the application of torquing forces directly thereto.

Still another object of the invention is to provide a magnetically precessible free gyroscope structure wherein the construction is such as to reduce the requirements for close tolerances in machined components thereof, and to reduce the effect of changing air gaps between faces of electromagnets and a peripheral surface of the spinning gyroscope wheel.

Other and further important objects of the present invention will become apparent from the disclosures in the following detailed specification, appended claims and acompanying drawings, wherein;

Figure 1:
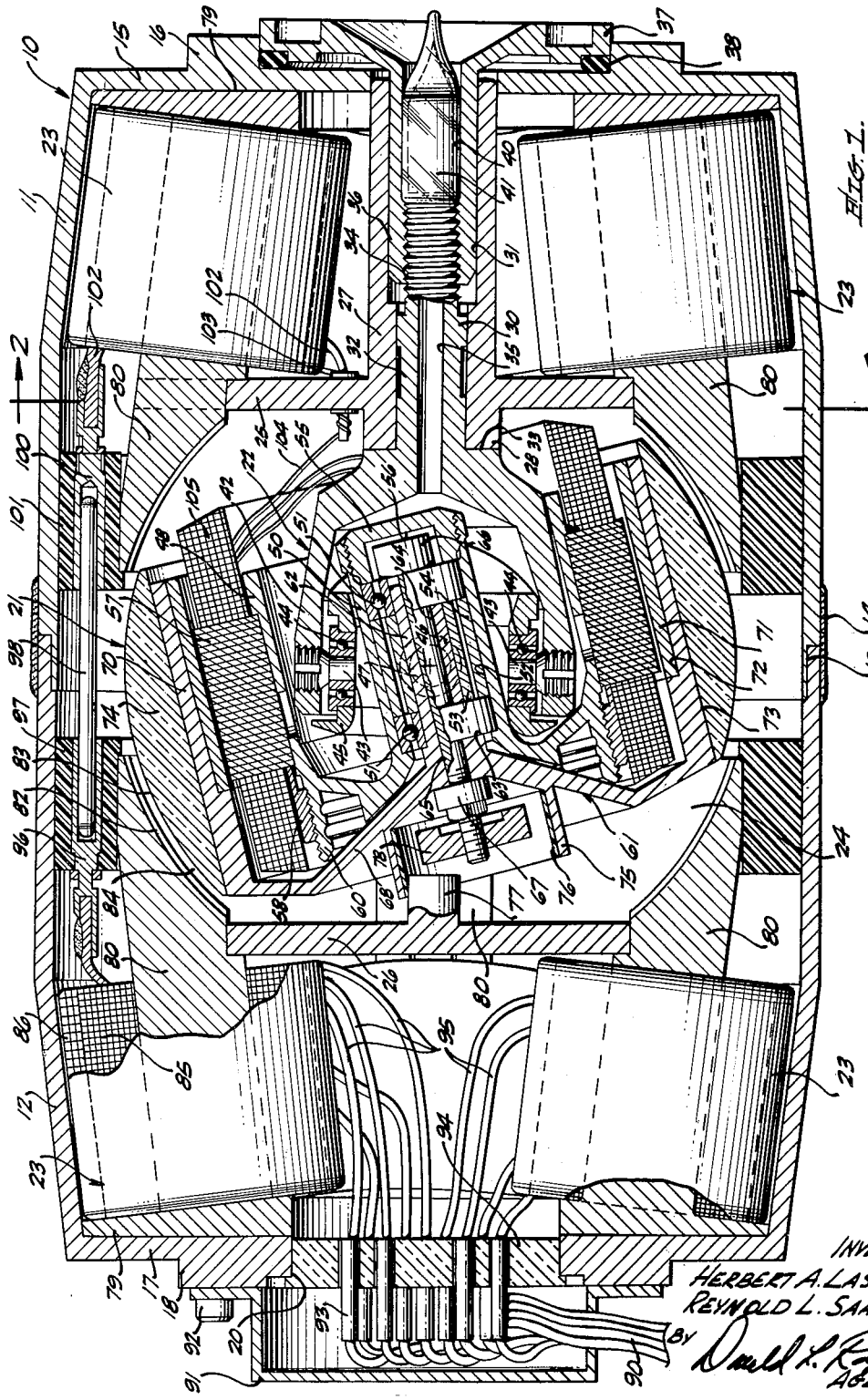
FIGURE 1 is an enlarged, longitudinal, sectional view through the present gyroscope unit and showing the gyroscopic wheel in one extreme position thereof.

With reference to the drawings, the gyroscopic unit of this invention comprises a housing 10 having, as view in FIG. 1, a right-hand portion 11 and a left-hand portion 12. The housing portions 11 and 12 are substantially identical and in the form of cylindrical, cup-shaped shells and are made from any suitable magnetic material such as steel or the like. The housing portions 11 and 12 are adapted for attachment to each other by means of a stepped joint 13, a ring of solder 14 or the like being used to secure the housing portions together and to provide a hermetic seal for a purpose to be hereinafter more fully described.

The housing portion 11 has an end wall 15 that is provided with an outwardly extending, annular, integral extension 16. The housing portion 12 has an end wall 17 that has a similar extension 18, there being an opening 20 positioned axially in the end wall 17.

As shown, a gyroscopic wheel, indicated generally at 21, is positioned centrally within the housing 10 and supported on a gimbal system indicated generally at 22. The housing 10 also serves to enclose a plurality of combination torquer and signal pickoff units indicated generally at 23.

The coil arrangements 23 and the armatures thereof are arranged in opposite ends of the housing 10, whereby to define a generally spherical cavity 24 in the central area of the housing 10, the gyroscopic wheel 21 and the gimbal system 22 therefor being positioned within the cavity 24.

The torquer and signal pickoff coil assemblies 23 are positioned by means of right and left-hand support plates 25 and 26 respectively. The support plates 25 and 26 are positioned laterally within the housing 10 and spaced axially from the end walls 15 and 17 respectively. The support plate 25 has an integral tubular shaft 27 disposed axially therefrom and an extension portion 28. The shaft 27 and the extension 28 are provided with a bore 30 and a bore 31. A post 32 forming a portion of the gimbal system 22 is adapted for disposition in the bore 30, there being a shoulder 33 that is adapted for engagement with an outer end of the extension 28. The post 32 has a reduced diameter threaded outer end portion 34 and an internal bore 35. The shoulder 33 is maintained in contact with the outer end of the extension portion 28 by means of an elongated tubular nut 36 that is disposed in the bore 31, and which threadably engages the threaded end portion 34 of the post 32. An outer end 37 of the nut 36 is flanged outwardly and adapted for reception in the extension 16 of the end wall 17, there being a sealing member 38 disposed between the flanged portion 37 and the end wall 15. The nut 36 is further provided with a bore 40, in which a pinch-off tube 41 is tightly disposed and secured by means of soldering, thus providing a means for evacuating the interior of the housing 10 through the bore 35 and for a purpose to be hereinafter more fully described.

The post 32 forms the support member for an outer gimbal support 42 that is in the form of a yolk. The support member 42 has a pair of aligned shafts 43 extending inwardly therefrom, the shafts 43 being journaled in bearings 44. The bearings 44 are carried by an inner gimbal member 45 that is in the form of an annular ring. The inner gimbal member 45 has a pair of bearings 46 carried thereby, the axis of the bearings 46 being circumferentially aligned with and disposed normal to the axis of the shafts 43. The bearings 46 serve rotatably to support stub shafts 47 which are carried by and extend radially inwardly from an annular motor mount 48. Thus, it may be seen that a universal gimbal mounting is provided for the motor mount 48 and the elements carried thereby.

The motor mount 48 has a centrally disposed hub 50 in which spaced bearings 51 are disposed. The bearings 51 are disposed within a bore 52 and maintained in their spaced relationship by means of annular spacers 53 and 54. A nut 55 threadably engages the outer end of the hub 50 and serves to retain the bearings 51 therein, there being a recess 56 in the nut 55.

As shown, a stator 57 of a spin motor is carried by the motor mount 48. The stator 57 is retained in position by means of a retaining ring 58 which threadably engages an extension 60 formed on the motor mount 48. The various elements of the gimbal structure 22, other than the shafts and bearings, together with the motor mount 48, are preferably made from a nonmagnetic material such as aluminum or the like.

As shown, the gyroscopic wheel 21 is rotatably journaled in the bearings 51. The wheel 21 has a hub 61 from which a shaft 62 extends. The shaft 62 has an inner shoulder 63 which engages an inner race of one of the bearings 51 and is provided with an axial bore 64. A bolt 65 is disposed through the bore 64 and has an enlarged head portion 66, that is disposed in the recess 56 in the nut 55, and which engages an inner race of the other of the bearings 51. The other end of the bolt 65 threadably receives a nut 67 which bears against an outer end of the hub 61, thus to secure the shaft 62 in position in association with the bearings 51.

The hub 61 has an end wall 68 and a rim 70, the rim 70 being positioned concentrically with the spin motor 57. The hub 61 is constructed from a nonmagnetic material such as aluminum or the like, there being a steel hysteresis ring 71 carried by the rim 70 and disposed in a counter bore 72 therein. The ring 71 has an inner surface that is axially coextensive with an inner surface of the rim 70. Accordingly, the hub 61 may thus be rotated through action of the spin motor stator 57 and the hysteresis action between the stator and the ring 71.

The outer surface 73 of the rim 70 of the hub 61 is cylindrical and serves to support a ferrite ring 74. The ring 74 of the ferrite material is secured to the rim 70 as by cementing or the like. The particular ferrite material employed herein for the ring 74 has essentially infinite resistance together with good magnetic flux carrying capabilities. The ring 74 serves to provide the peripheral weight for the gyroscopic wheel 21 and serves additional functions to be hereinafter more fully described.

In order to limit angular movement of the wheel 21, the hub 61 is provided with a central tubular extension 75 that has an insert 76 of a plastic material or the like. The extension 75 and the insert 76 therein are adapted for cooperation with a stop member 77 that is formed integrally with and extends axially from the support plate 26. The insert 76, upon contact with the stop 77, tends to move the wheel 21 in a direction away from the stop 77. A weight 78 threadably engages the shaft 65 for counterbalance purposes.

Figure 2:
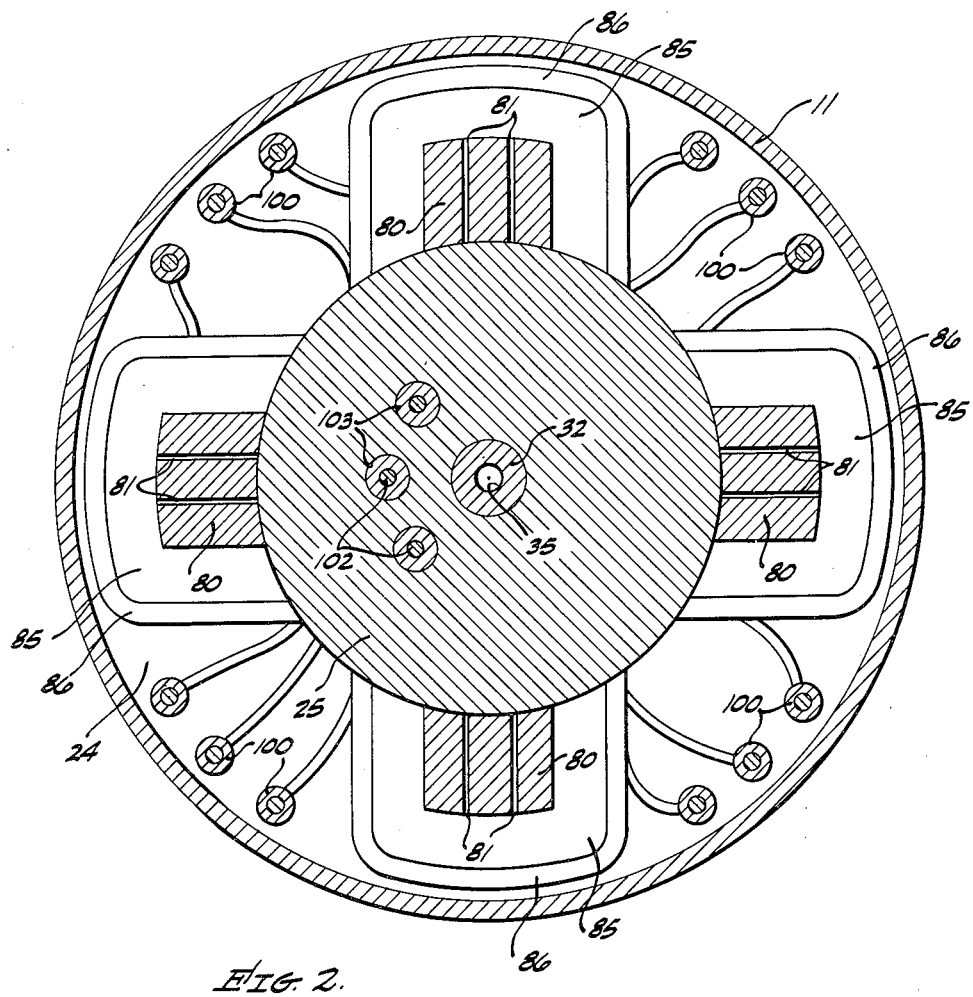
FIG. 2 is a transverse section view showing the arrangement of the torquers and taken substantially as indicated by line 2—2, FIG. 1.
Figure 3:
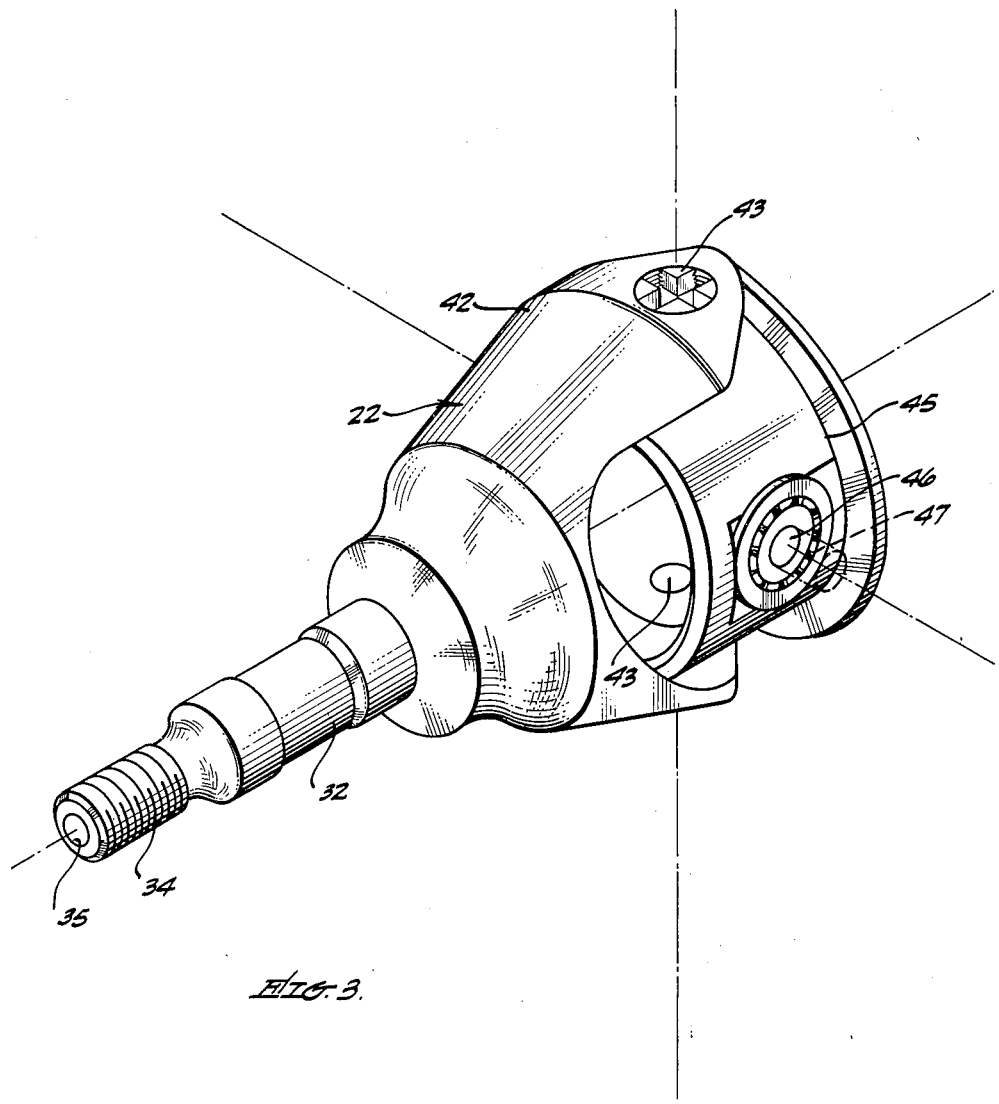
FIG. 3 is a perspective view showing the gimbal system of the present gyroscopic unit.
Figure 5:
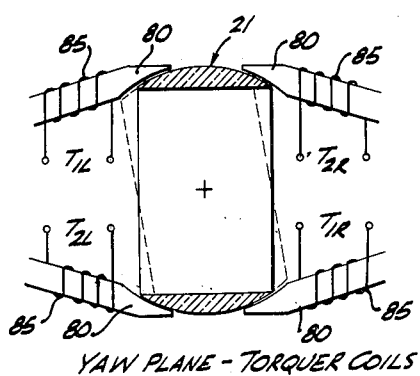
FIGS. 5 and 6 are partially schematic views showing the yaw and pitch plane torquer controls.
Figure 6:
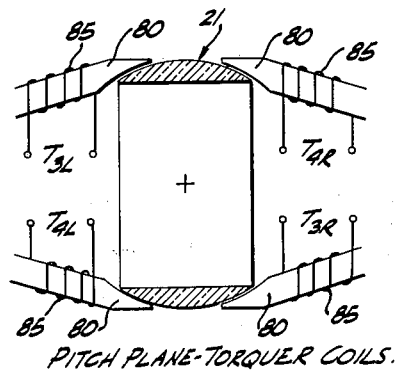

The torquing and signal pickoff coils 23 are supported from annular plates 79 that are positioned in contact with inner surfaces of the end walls 15 and 17 respectively, of the housing portions 11 and 12. Each of the torquers is provided with cores 80 which are formed integrally with and extend outwardly from the plates 79. The cores 80 are each slotted as at 81. Additionally, outer ends of the cores 80 are spherically formed whereby to conform to the configuration of the outer surface 83 of the ferrite ring 74, there being an air gap 84 formed therebetween. Each of the cores 80 has a torquing coil 85 wound thereabout, together with a pickoff coil 86 that is wound about and concentric with each of the torquing coils 85. As shown in FIGS. 1 and 2, four torquing and pickoff coil arrangements are positioned in each end of the housing 10 and arranged with pairs in opposite ends disposed in axial alignment and with each group of four being disposed with axes thereof positioned normal to each other. As shown in FIG. 5, the coils 85 and the cores 80, which comprise the magnetic torquers for precessing the wheel 21 in the yaw plane, are arranged in a common longitudinal plane and are identified as $T_{1L}$, $T_{1R}$, $T_{2L}$, and $T_{2R}$. As shown in FIG. 6, the torquers effecting precession of the wheel 21 in the pitch plane are arranged in a common longitudinal plane that is normal to the plane of the yaw plane torquers. The pitch plane torquers are identified in FIG. 6 as $T_{3L}$, $T_{3R}$, $T_{4L}$, and $T_{4R}$.

Figure 8:
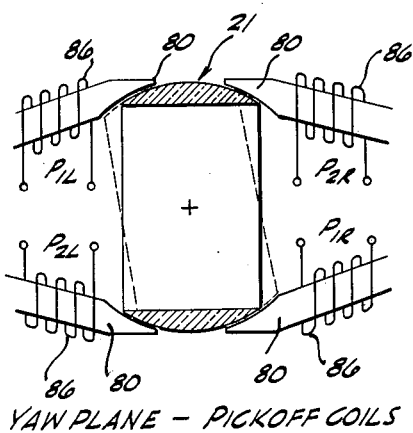
FIGS. 8 and 9 are partially schematic views, showing the yaw and pitch plane position sensing pickoff coil arrangement.
Figure 9:
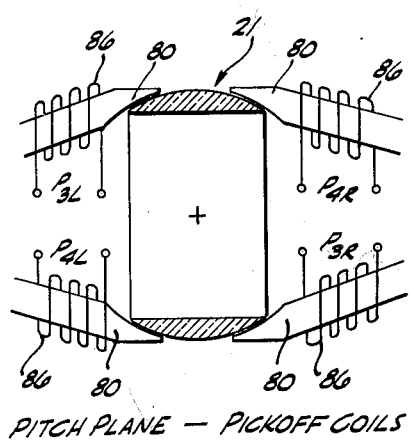

As shown in FIG. 8, the coils 86 that are wound about the coils 85 and which form signal pickoff coils for sensing movement in the wheel 21 of the yaw plane, are identified as $P_{1L}$, $P_{1R}$, $P_{2L}$, and $P_{2R}$. The pickoff coils for sensing movement of the wheel 21 in the pitch plane are shown in FIG. 9 and identified as $P_{3L}$, $P_{3R}$, $P_{4L}$, and $P_{4R}$.

Figure 4:
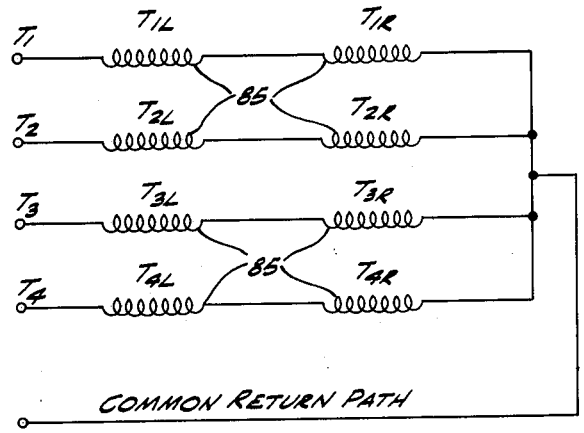
FIG. 4 is a diagrammatic representation of a typical circuit for the magnetic torquers.
Figure 7:
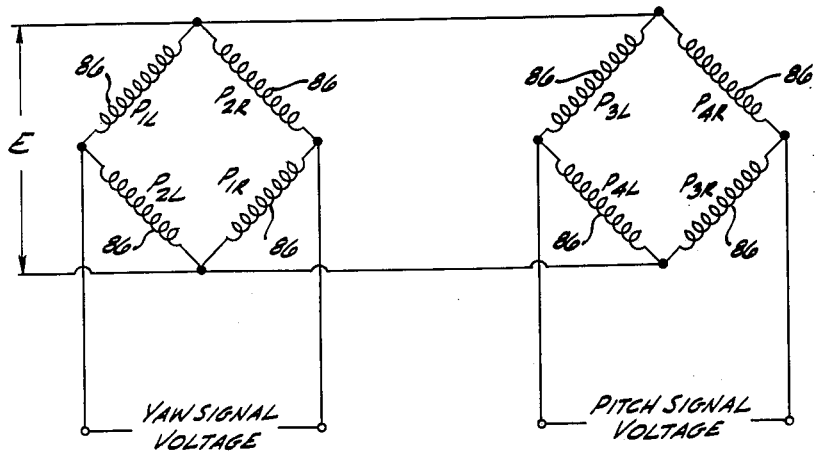
FIG. 7 is a diagrammatic view showing the arrangement of the pickoff or position sensing arrangement for the present gyroscopic unit.

The method of connecting the torquer coils is illustrated in FIG. 4, while the method of connecting the signal pickoff coils is illustrated in FIG. 7 and will be hereinafter more fully described.

As shown in FIG. 1, electrical connection is made with the various torquing and pickoff coils, as well as the spin motor stator 57, through a cable 90 which extends into a housing 91 that is secured to the end wall 17 of the housing portion 12 by means of screws 92. The individual conductors in the cable 90 are connected to terminals 93 that are in turn carried by an insulator 94 that is disposed within the opening 20 in the end wall 17. The insulator 94 may be glass or the like and compressibly disposed within the opening 20, thus to provide a hermetic seal therein. A plurality of internal leads 95 from the terminals 93 extend to terminals 96 that are carried by an insulating ring 97. The terminals 96 are connected by means of pins 98 to terminals 100 that are in turn carried by an insulating ring 101. The rings 97 and 101 are carried respectively by the housing portions 12 and 11. The terminals 100 serve to connect leads 102 as needed for the torquing and pickoff coils. Additionally, a portion of the leads 102 extend to terminals 103 from which leads 104 extend to coils 105 of the spin motor stator 57. The insulating rings 97 and 101 serve to provide an outer peripheral support for the torquer cores 80. The supports 25 and 26 serve to provide a central support for the cores.

In applying the precessing torque directly to the gyroscope wheel 21, it is necessary that a magnetic material constitute a portion of the gyroscope wheel, this magnetic material being used in the construction of a ferrite ring 74. It is also necessary that the magnetic material lie in the magnetic field created by the torquers. These conditions are satisfied by the present construction and the laws of magnetic attraction may thus be utilized to provide a means for applying torque directly to the spinning gyroscope wheel. This could not be accomplished if the magnetic material carried by the spining wheel is a good conductor, in which case, large eddy currents would be induced in it, since there would be a rapidly moving conductor in a magnetic field. In such an instance, the induced voltages and currents would be quite large, since the change in flux with time would be large each time a portion of the wheel passed under a torquer pole face. These large eddy currents would act to create an eddy current braking effect upon the gyroscope wheel, would act to slow down the wheel and the induced drag would cause undesirable drift thereof. These characteristics are not inherent in the present mechanism, due to the use of the ferrite material in the ring 74. It has been determined that ferrite material may be used for this purpose, has sufficient strength, and may be machined to conform to the desired configuration. In actual practice, the wheel is rotated at an annular velocity of approximately 12,000 r.p.m.

The magnetic flux paths of the present gyroscope unit travel generally from left to right, as viewed in FIG. 1. In other words, these flux paths originate in the electromagnets forming the torquers, travel through the cores 80 of the four torquers in the left-hand portion of the apparatus, through the ferrite ring 74 and the cores 80 of the torquers located in the right-hand portion of the unit. Thereafter the end wall 15 and the housing portion 11 serve to complete the magnetic circuit, together with the housing portion 12 and the end wall 17. The annular plates 79 serve magnetically to connect the end walls 15 and 17 with the cores 80 of the plurality of torquers. This particular arrangement enables a structure having a relatively low magnetic leakage, thus creating a highly efficient apparatus.

The magnetic torquing structure described hereinbefore and the two identical groups consisting of four torquers, each serve to perform identical functions and produce torques that are equal and additive. Two torquers from each group perform torquing functions in the yaw plane, a similar arrangement being provided in the pitch plane. As indicated, the yaw and pitch planes are perpendicular planes, intersecting at the center of the gimbal 22 in such a manner that their intersection forms a line corresponding with the axis of the generally spherically shaped gyroscopic wheel. The torquers in the yaw plane, as illustrated in FIG. 5 and identified as $T_{1L}$ and $T_{1R}$ operate identically and produce torques that are equal and additive and which are opposed by the equal and additive torques produced by the torquers $T_{2L}$ and $T_{2R}$. The torquers in the pitch plane are arranged in a similar manner as schematically illustrated in FIG. 6. Inasmuch as the outer surface 83 of the ferrite ring 74 is spherically shaped and the torquer pole faces 82 form a partial sphere around the gyroscope wheel 21, the identical torquers positions $T_{1L}$ and $T_{1R}$ may be located in the diagonal arrangement as far as operation thereof is concerned. This arrangement creates the desired operational characteristics of the torquers and an insensitivity to small errors in positioning the gyroscope wheel within the partial sphere formed by the torquer pole faces. This aspect of the construction is important, inasmuch as it is impossible from a practical manufacturing and machining standpoint perfectly to center the spherical outer surface 83 of the gyroscope wheel within the partial sphere corresponding to the torquer pole faces 82. Any error in positioning the wheel will cause a variance in the air gap 84, as between different pole faces 82, and such air gap at one pole face will be shorter than the normal length, while the air gap for a diagonally opposite pole face will be longer by a similar amount. For example, if the gyroscope wheel 21 is displaced in a direction to shorten the air gap of torquer $T_{1L}$, the air gap of the diagonally opposing torquer $T_{1R}$ would be lengthened by a similar amount. While torquer $T_{1L}$ would have a stronger force, torquer $T_{1R}$ would have a weaker force by a similar amount. Since the arrangement is such, whereby diagonally disposed torquers are additive, the sum of their torques is the same as if no displacement is present.

The torque exerted upon the gyroscope wheel 21 is in such a direction as to tend to increase the air gap permeance. Thus, for the torquers in one plane, say the yaw plane, there are torques exerted upon the gyroscope wheel in a direction tending to move the wheel about the yaw axis. The torques exerted upon the wheel are in opposition. Inasmuch as the physical dimensions affecting the torque exerted upon the gyroscope wheel are selected to be exactly the same for each torquer, the resultant torque will be zero, provided the magnetomotive force across each air gap is exactly the same. When the air gap magnetomotive force provided by torquers $T_{1L}$ and $T_{1R}$ is larger than that provided by the opposing torquers $T_{2L}$ and $T_{2R}$, then a resultant torque will exist to precess the gyroscope wheel. Since the air gap magnetomotive forces are varied in correspondence with an applied signal, a resultant torque is created to precess the gyroscope in correspondence with the applied signal. The signal is applied to the torquer coils in the form of an addition or subtraction to a steady state direct current flowing in the torquer coils. In practice, this steady state current may be in the nature of 60 milliamperes. As the current in a particular pair of torquer coils is increased, the air gap magnetomotive force of this particular torquer is increased. The signal magnetomotive force is arranged to add to the steady state magnetomotive force in one pair of torquers while subtracting an equal amount from the steady state of magnetomotive force in the opposing pair of torquers. Thus, the resultant torque acting in, say, the yaw plane, is a linear function of the signal applied thereto. Since the torquers in the pitch plane are identical to those in the yaw plane, the same conditions would apply.

The present magnetically torqued gyroscopic unit is not subject to undesirable magnetic torques that might otherwise be present when a torquing signal is zero.

Such stray magnetic torques would act to cause the gyroscope to drift in the same manner that an unbalance about the gimbal center would cause such drift. Since the main function of a gyroscope is to provide a fixed reference in space, it is desirable that gyroscope drift be nonexistent. It is important, from a practical standpoint, perfectly to balance a gyroscope and to employ as near as possible frictionless gimbal bearings and all known gyroscopes have some drift. However, by careful balancing and the proper selection of gimbal bearings, this drift is maintained in the present apparatus to an acceptably small value. Adding even small magnetic drifts to the unavoidable drifts would be undesirable and large magnetic drifts would make the unit impractical. The particular present structure is maintained free from magnetic drift by the arrangement of the magnetic circuit of the torquers to maintain equal flux densities in the air gaps under opposed torquer pole faces regardless of the position or angle of tip of the gyroscope wheel and under zero signal conditions. In other words, the spin axis of the gyroscope wheel will remain fixed in space to provide a space reference until a command signal is applied to the torquers to change its position in a prescribed direction by some desired amount. At times when no signal is applied to the torquers, the resultant magnetic torque exerted upon the gyroscope wheel is zero and the resultant magnetic torque must be zero, regardless of the position of the gyroscope wheel with respect to the torquer pole faces. To accomplish this, the flux in opposing torquers is changed in equal proportions to a change in the air gap flux path cross section areas as the gyroscope wheel is tipped about its two gimbal axes. The pole face flux densities of opposing torquers will therefor remain equal. The magnetic circuits are thus arranged to maintain the equal flux densities in opposing torquer pole faces when there is no applied signal and with the gyroscope wheel at any angle of tip. Thus, no magnetic torques are exerted on the gyroscope wheel except those desired torques produced by a signal to the torquer coils.

In connection with the pickoff coils 86, the arrangement of these coils is shown in FIG. 1, as disposed about the torquing coils 85. This arrangement is also shown schematically in FIGS. 8 and 9, with the electrical circuit therefor being shown in FIG. 7 and taking the form of a pair of bridge circuits. The required function of the position sensing or pickoff devices represented by the coils 86 is the production of an electrical signal voltage having a magnitude that is a linear measure of the angle of tip of the gyroscope wheel about a normal or centered position. The polarity of the signal is an indication of the direction of tip of the gyroscope wheel. In order to obtain such signals, two separate signal voltages are required, one to provide a measure of the angle of tip about each of the two gimbal axes.

In practice, the present gyroscope position sensing devices utilize the same cores 80 as utilized in the torquing system and the coils 86 are wound physically about each of the eight torquing coils 85. The coils 86 are relatively small, as compared to the torquing coils 85, and serve to carry an alternating current that is necessary to produce an induced voltage across each of the coils 85, with this induced voltage being a linear function of the alternating flux passing through the coils 86. Thus, the comparative magnitudes of the fluxes passing through each torquer coils 85 are a direct function of the position or angle of tip of the gyroscope wheel and the induced voltages in the pickoff coils 86 are a linear function of the position of the gyroscope wheel.

With reference to FIG. 7, the coils 86 are arranged to form two inductance bridges that are balanced when the gyroscope wheel is centered or is in a null position. One of the bridge circuits measures the angle of tip in the yaw plane, while the other bridge circuit measures the angle of tip in the pitch plane. The yaw plane pickoff coils are illustrated in FIG. 8 with respect to the gyroscope wheel, with the pitch plane pickoff coils being illustrated in FIG. 9. Each of the pickoff coils $P_1$, $P_2$, $P_3$, and $P_4$ have identical right and left partners located in each respective half of the unit, and so designated. These coil partners are identical to provide like changes in air gap reluctance as the gyroscope wheel is tipped. As shown in FIG. 7, an alternating voltage is applied across each pickoff bridge and is represented at E. When the gyroscope wheel is perfectly centered, the voltage drops across coils $P_1$, $P_2$, $P_3$, and $P_4$ are equal, and the bridges are balanced. Under these conditions, the signal voltages will also be zero, and when the gyroscope wheel tips, the bridges will be unbalanced and signals will be produced representing the amount and direction of tip of the gyroscope wheel.

It may thus be seen that the present magnetically precessible free gyroscope may be constructed as a light weight, relatively small and functional apparatus, due primarily to the use of the ferrite material as a portion of the rotating wheel and to the particular arrangement of the spin motor, torquers and signal pickoff or position sensing coils. In actual practice, the cavity 24 is evacuated through use of the pinch-off tube 41, thereby eliminating resistance due to air movement about the rotating gyroscope wheel 21. Thus, a gyroscope device having high performance characteristics is provided.

Having thus described the invention and the present embodiment thereof, it is desired to emphasize the fact that many modifications may be resorted to in a manner limited only by a just interpretation of the following claims.

We claim:

1. In a gyroscope device: a supporting structure; a gimbal system carried by said supporting structure; a wheel rotatably carried by said gimbal system; wheel rotating means also carried by said gimbal system, said wheel having a peripheral portion of ferrite material; electromagnetic torque applying means disposed on said structure and positioned for direct application of torquing forces to said wheel; and wheel position sensing means operatively associated with said torque applying means.

2. In a gyroscope device: a supporting structure; a gimbal system carried by said supporting structure; a wheel rotatably carried by said gimbal system; wheel rotating means also carried by said gimbal system, said wheel having a peripheral portion of ferrite material; electromagnetic torque applying means disposed on said structure and positioned for direct application of torquing forces to said ferrite material portion of said wheel; and wheel position sensing means operatively associated with said torque applying means.

3. In a gyroscope device: a supporting structure; a gimbal system carried by said supporting structure; a generally spherical wheel rotatably carried by said gimbal system; wheel rotating means also carried by said gimbal system, said wheel having a peripheral portion of ferrite material; electromagnetic torque applying means having generally spherical faces, disposed on said structure and positioned for direct application of torquing forces to said wheel; and wheel position sensing means operatively associated with said torque applying means.

4. In a gyroscope device, the combination of: a supporting structure; a gimbal system carried by said supporting structure; a wheel rotatably carried by said gimbal system; wheel rotating hysteresis motor means also carried by said gimbal system, said wheel having a peripheral portion of ferrite material; electromagnetic torque applying means disposed on said structure and positioned for direct application of torquing forces to said wheel; and wheel position sensing coil means operatively associated with said torque applying means.

5. In a gyroscope device: a supporting structure; a gimbal system carried by said supporting structure; a generally spherical wheel rotatably carried by said gimbal system; wheel rotating means also carried by said gimbal system; said wheel having a peripheral portion of ferrite material; electromagnetic torque applying means having generally spherical faces, disposed on said structure and positioned for direct application of torquing forces to said ferrite material portion of said wheel; and wheel position sensing means operatively associated with said torque applying means.

6. In a gyroscope device, the combination of: a supporting structure; a gimbal system carried by said supporting structure; a wheel rotatably carried by said gimbal system; wheel rotating hysteresis motor means also carried by said gimbal system, said wheel having a peripheral portion of ferrite material; electromagnetic torque applying means disposed on said structure and positioned for direct application of torquing forces to said ferrite material portion of said wheel; and wheel position sensing coil means operatively associated with said torque applying means.

7. In a gyroscope device, the combination of: a supporting structure; a gimbal system carried by said supporting structure; a generally spherical wheel rotatably carried by said gimbal system; wheel rotating hysteresis motor means also carried by said gimbal system, said wheel having a peripheral portion of ferrite material; electromagnetic torque applying means having generally spherical faces, disposed on said structure and positioned for direct application of torquing forces to said ferrite material portion of said wheel; and wheel position sensing coil means operatively associated with said torque applying means.

8. A gyroscope device comprising, in combination: a housing; a two direction of movement gimbal structure supported by said housing and disposed therein; a gyroscope wheel freely rotatably carried by said gimbal structure, a peripheral portion of said wheel being of a ferrite material, said wheel having a generally spherical outer configuration; a spin motor carried by said gimbal structure and adapted for rotation of said wheel; a plurality of magnetic torquing coils disposed in circumferential spaced relationship in groups in said housing and on lateral sides of said wheel, each of said coils having a core member, the pole face of which forms a partial sphere and being disposed adjacent a peripheral surface of said ferrite portion of said wheel, said coils having axes lying in perpendicular planes intersecting on a line extending through a center of rotation of said wheel, coils lying in one of said planes serving to control yaw torquing of said wheel and in the other of said planes, pitch torquing thereof by direct application of magnetic flux to said ferrite portion of said wheel; and a position sensing coil disposed in association with each of said torquing coils whereby to provide a signal relating to positions of said wheel relative to said torquing coils.

9. A gyroscope device comprising, in combination: a housing; a two direction of movement gimbal structure supported by said housing and disposed therein; a gyroscope wheel freely rotatably carried by said gimbal structure, a peripheral portion of said wheel being of a ferrite material, said wheel having a generally spherical outer configuration; a spin motor carried by said gimbal structure and adapted for rotation of said wheel; a plurality of magnetic torquing coils disposed in circumferential spaced relationship in groups in said housing and on lateral sides of said wheel, each of said coils having a core member, the pole face of which forms a partial sphere and being disposed adjacent a peripheral surface of said ferrite portion of said wheel, said coils having axes lying in perpendicular planes intersecting on a line extending through a center of rotation of said wheel, diagonally disposed pairs of said coils being serially electrically interconnected, coils lying in one of said planes serving to control yaw torquing of said wheel and in the other of said planes, pitch torquing thereof by direct application of magnetic flux to said ferrite portion of said wheel; and a position sensing coil disposed in association with each of said torquing coils whereby to provide a signal relating to positions of said wheel relative to said torquing coils.

10. A gyroscope device comprising, in combination: a housing; a two direction of movement gimbal structure supported by said housing and disposed therein: a gyroscope wheel freely rotatably carried by said gimbal structure, a peripheral portion of said wheel being of a ferrite material, said wheel having a generally spherical outer configuration; a spin motor carried by said gimbal structure and adapted for rotation of said wheel by hysteresis action; a plurality of magnetic torquing coils disposed in circumferential spaced relationship in groups in said housing and on lateral sides of said wheel, each of said coils having a core member, the pole face of which forms a partial sphere and being disposed adjacent a peripheral surface of said ferrite portion of said wheel, said coils having axes lying in perpendicular planes intersecting on a line extending through a center of rotation of said wheel, diagonally disposed pairs of said coils being serially electrically interconnected, coils lying in one of said planes serving to control yaw torquing of said wheel and in the other of said planes, pitch torquing thereof by direct aplication of magnetic flux to said ferrite portion of said wheel; and a position sensing induction coil disposed in association with each of said torquing coils whereby to provide a signal relating to positions of said wheel relative to said torquing coils.

11. A miniature magnetically precessible free gyroscope device comprising, in combination: a sealed and evacuated housing; a two direction of movement gimbal structure supported from one end of said housing and disposed therein; a gyroscope wheel freely rotatably carried by said gimbal structure, a peripheral portion of said wheel being of a ferrite material, said wheel having a generally spherical outer configuration; a spin motor carried by said gimbal structure and adapted for rotation of said wheel by hysteresis action; a plurality of magnetic torquing coils disposed in circumferential spaced relationship in groups in said housing and on lateral sides of said wheel each of said coils having a core member, the pole face of which forms a partial sphere and being disposed adjacent a peripheral surface of said ferrite portion of said wheel, said coils having axes lying in perpendicular planes intersecting on a line extending through a center of rotation of said wheel, diagonally disposed pairs of said coils being serially electrically interconnected, coils lying in one of said planes serving to control yaw torquing of said wheel and in the other of said planes, pitch torquing thereof by direct application of magnetic flux to said ferrite portion of said wheel; and a position sensing induction coil disposed in association with each of said torquing coils whereby to provide a signal relating to positions of said wheel relative to said torquing coils, said sensing coils being electrically interconnected to form two inductance bridge circuits representing yaw and pitch signals respectively.

12. A miniature magnetically precessible free gryoscope device comprising, in combination: a sealed and evacuated housing; a two direction of movement gimbal structure supported from one end of said housing and disposed therein; a gyroscope wheel freely rotatably carried by said gimbal structure, a peripheral portion of said wheel being of a ferrite material, said wheel having a generally spherical outer configuration; means carried by said housing for limiting pitch and yaw movement of said wheel; means for counterbalancing said wheel; a spin motor carried by said gimbal structure and adapted for rotation of said wheel by hysteresis action; a plurality of magnetic torquing coils disposed in circumferential spaced relationship in groups in said housing and on lateral sides of said wheel, each of said coils having a core member, the pole face of which forms a partial sphere and being disposed adjacent a peripheral surface of said ferrite portion of said wheel, said coils having axes lying in perpendicular planes intersecting on a line extending through a center of rotation of said wheel, diagonally disposed pairs of said coils being serially electrically interconnected, coils lying in one of said planes serving to control yaw torquing of said wheel and in the other of said planes, pitch torquing thereof by direct application of magnetic flux to said ferrite portion of said wheel; and a position sensing induction coil disposed in association with each of said torquing coils whereby to provide a signal relating to positions of said wheel relative to said torquing coils, said sensing coils being electrically interconnected to form two inductance bridge circuits representing yaw and pitch signals respectively.

References Cited in the file of this patent

UNITED STATES PATENTS

| | | |
|---|---|---|
| 2,293,092 | Wittkuhuns | Aug. 18, 1942 |
| 2,534,824 | Jones | Dec. 19, 1950 |
| 2,669,126 | Simmons et al. | Feb. 16, 1954 |
| 2,822,694 | McKenney | Feb. 11, 1958 |
| 2,908,171 | Biberman | Oct. 13, 1959 |